United States Patent
Brinkman et al.

(10) Patent No.: US 8,760,804 B2
(45) Date of Patent: Jun. 24, 2014

(54) SUBSTRATE NITROGEN PLASMA TREATMENT FOR SOFTER COFE MAIN POLE WRITER FORMATION

(75) Inventors: Elizabeth A. Brinkman, Santa Clara, CA (US); Ning Shi, San Jose, CA (US); Brian R. York, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/411,424

(22) Filed: Mar. 2, 2012

(65) Prior Publication Data

US 2013/0229728 A1    Sep. 5, 2013

(51) Int. Cl.
*G11B 5/127* (2006.01)

(52) U.S. Cl.
USPC ............. 360/123.02; 360/110; 360/123.05; 360/123.09; 360/123.12

(58) Field of Classification Search
USPC ............. 360/110, 123.02, 123.05, 123.09, 360/123.12
See application file for complete search history.

(56) References Cited

U.S. PATENT DOCUMENTS

| | | | |
|---|---|---|---|
| 5,885,750 A | 3/1999 | Hsiao et al. | |
| 6,853,518 B2 * | 2/2005 | Westwood | 360/317 |
| 7,500,302 B2 | 3/2009 | Hsiao et al. | |
| 7,518,824 B2 | 4/2009 | Sasaki et al. | |
| 7,859,792 B2 | 12/2010 | Miyata et al. | |
| 8,231,796 B1 * | 7/2012 | Li et al. | 216/22 |
| 2008/0239580 A1 | 10/2008 | Harada et al. | |
| 2008/0253027 A1 * | 10/2008 | Yamaguchi et al. | 360/235.4 |
| 2009/0162699 A1 | 6/2009 | Sasaki et al. | |
| 2009/0277870 A1 | 11/2009 | Sasaki et al. | |
| 2010/0061016 A1 * | 3/2010 | Han et al. | 360/125.3 |
| 2011/0011744 A1 * | 1/2011 | Chen et al. | 205/85 |
| 2011/0090595 A1 * | 4/2011 | Hirata et al. | 360/125.03 |
| 2011/0094888 A1 | 4/2011 | Chen et al. | |
| 2011/0147343 A1 | 6/2011 | Araki et al. | |
| 2011/0188151 A1 | 8/2011 | Yamaguchi et al. | |

FOREIGN PATENT DOCUMENTS

JP    2010/020856 A    1/2010

OTHER PUBLICATIONS

Sato et al., "Electrical Properties of Ni—Cr—N Thin Films Deposited by Multitarget Reactive Sputtering," 2001 The Japan Society of Applied Physics, Japan Journal of Applied Physics, vol. 40, Part 1, No. 8, Aug. 2001, pp. 5091-5094.

(Continued)

Primary Examiner — Wayne Young
Assistant Examiner — Carlos E Garcia
(74) Attorney, Agent, or Firm — Zilka-Kotab, PC

(57) ABSTRACT

A magnetic head according to one embodiment includes a nonmagnetic gap layer in a trench; a pole seed layer above the nonmagnetic gap layer; and a pole layer of a magnetic material above the pole seed layer, wherein at least one of the nonmagnetic gap layer, the pole seed layer and the pole layer has nitrogen therein. A magnetic head according to another embodiment includes a nonmagnetic gap layer in a trench; a pole seed layer above the nonmagnetic gap layer, the pole seed layer being comprised primarily of a material selected from a group consisting of NiCr, Ta/Ru, Ta/Rh, NiCr/Ru, NiCr/Rh, NiCr, CoOx, Ru, Rh, Cu, Au/MgO, Ta/Cu; and a pole layer comprised primarily of CoFe above the pole seed layer, wherein at least one of the nonmagnetic gap layer, the pole seed layer and the pole layer has nitrogen therein.

23 Claims, 6 Drawing Sheets

(56) References Cited

OTHER PUBLICATIONS

Sun et al., "Stress, microstructure, and magnetic softness of high saturation magnetization (Bs) FeCoN Films," 2005 American Institute of Physics, Journal of Applied Physics, vol. 97, pp. 10F906/1-10F906/3.

Vas'Ko et al., "Structure, Stress, and Magnetic Properties of High Saturation Magnetization Films of FeCo," 2004 IEEE, IEEE Transactions on Magnetics, vol. 40, No. 4, Jul. 2004, pp. 2335-2337.

Zou et al., "Influence of Stress and Texture on Soft Magnetic Properties of Thin Films," 2002 IEEE, IEEE Transactions on Magnetics, vol. 38, No. 5, Sep. 2002, pp. 3501-3520.

Vopsaroui et al., "Preparation of high moment CoFe films with controlled grain size and coercivity," 2005 American Institute of Physics, Journal of Applied Physics, vol. 97, pp. 10N303/1-10N303/3.

\* cited by examiner

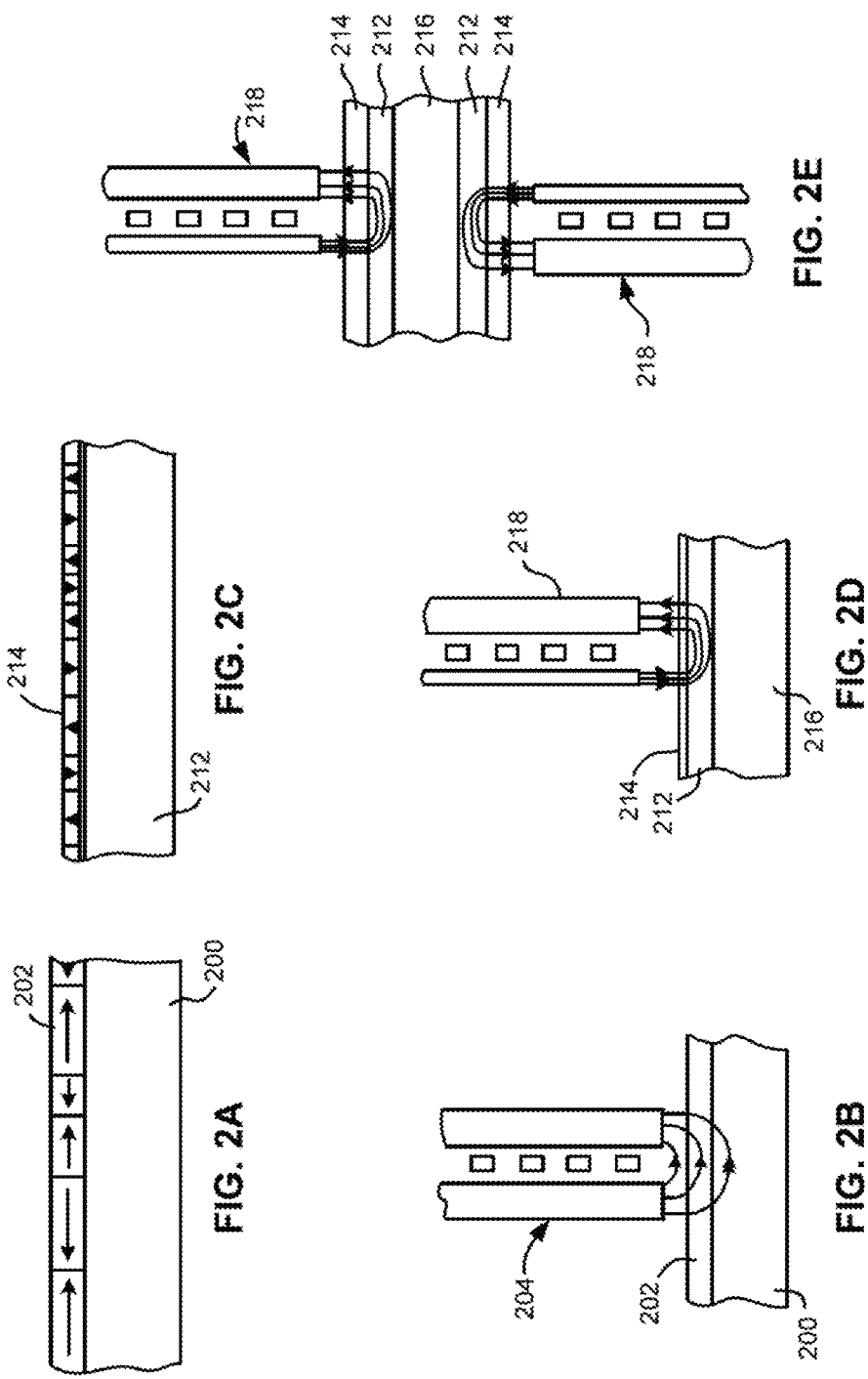

SUBSTRATE NITROGEN PLASMA TREATMENT FOR SOFTER COFE MAIN POLE WRITER FORMATION

FIELD OF THE INVENTION

The present invention relates to data storage systems, and more particularly, this invention relates to methods to improve the layered structure, and the magnetic properties of a main pole writer.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles.

The Damascene design process is used in forming write poles. It is usually preferred that the Damascene design process includes a nonmagnetic metal layer, which is usually deposited conformally across the wafer and into the Damascene trench. Such metal layer will functionally be part of the gap separating the main pole and the surrounding shield.

However, due to the extremely small dimensions of the Damascene trench and various processing constraints such as process temperature requirements, there are very few process choices for creating such a metallic layer, one option including Atomic Layer CVD Ru deposition (ALCVD Ru). It is critically important that this Ru layer provides, correct material interfacial microstructure to promote CoFe growth with high permeability for high data rate. Much work has been put into "seed" process, either for CoFe growth (such as the use of NiCr as seed) or seeding for Ru (such as Ta or NiCr). There may be limitations with the seed approach, which usually relies on vacuum deposition techniques.

Moreover, a favorable seed for CoFe growth depends on many factors such as deposition parameters, substrate type and condition. For cases where film growth is inside a constrained volume such as a Damascene trench, film growth conditions may be completely different from those out on an open surface, because these techniques not only rely on chemical potential differences but also on vectorial momenta of the reactive species. For at least the forgoing reasons, improvements in the development of write pole formation would be very beneficial.

SUMMARY

A magnetic head according to one embodiment includes a nonmagnetic gap layer in a trench; a pole seed layer above the nonmagnetic gap layer; and a pole layer of a magnetic material above the pole seed layer, wherein at least one of the nonmagnetic gap layer, the pole seed layer and the pole layer has nitrogen therein.

A method for forming the magnetic head includes forming the nonmagnetic gap layer; performing a nitrogen plasma surface treatment on the nonmagnetic gap layer for infusing nitrogen into the nonmagnetic gap layer; forming a pole seed layer above the nonmagnetic gap layer after performing the nitrogen ash; and plating a pole layer of a magnetic material above the pole seed layer.

A magnetic head according to another embodiment includes a nomnagnetic gap layer in a trench; a pole seed layer above the nonmagnetic gap layer, the pole seed layer being comprised primarily of a material selected from a group consisting of NiCr, Ta/Ru, Ta/Rh, NiCr/Ru, NiCr/Rh, NiCr, CoOx, Ru, Rh, Cu, Au/MgO, Ta/Cu; and a pole layer comprised primarily of CoFe above the pole seed layer, wherein at least one of the nonmagnetic gap layer, the pole seed layer and the pole layer has nitrogen therein.

A magnetic data storage system such as a disk drive system, according to one embodiment, may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic head includes a nonmagnetic gap layer in a trench; a pole seed layer above the nonmagnetic gap layer; and a pole layer of a magnetic material above the pole seed layer, wherein at least one of the nonmagnetic gap layer, the pole seed layer and the pole layer has nitrogen therein.

In another general embodiment, a method for forming a magnetic head includes forming the nonmagnetic gap layer; performing a nitrogen plasma surface treatment on the nonmagnetic gap layer for infusing nitrogen into the nonmagnetic gap layer; forming a pole seed layer above the nonmagnetic gap layer after performing the nitrogen ash; and plating a pole layer of a magnetic material above the pole seed layer.

Figure 1:
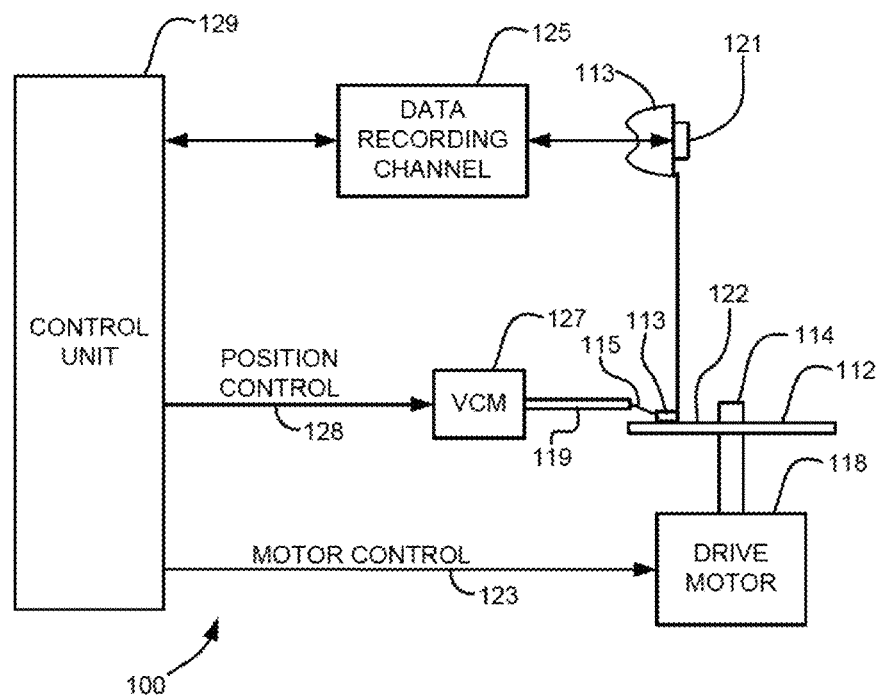
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3B:
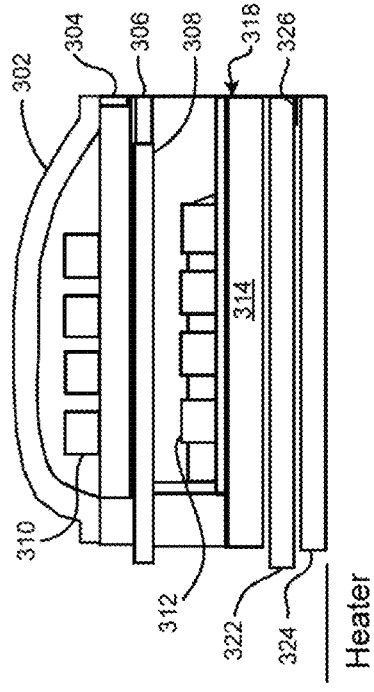
FIG. 3B is a cross-sectional view of one particular embodiment of a piggyback magnetic head with helical coils.
Figure 3A:
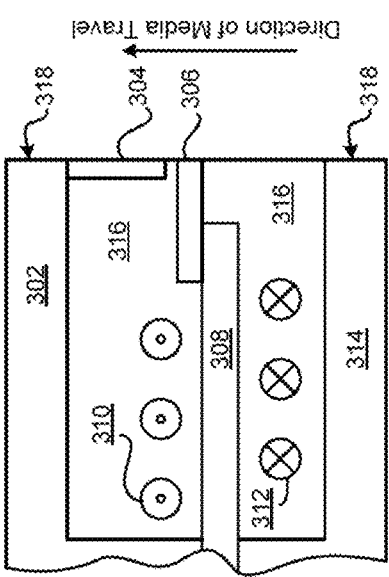
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4B:
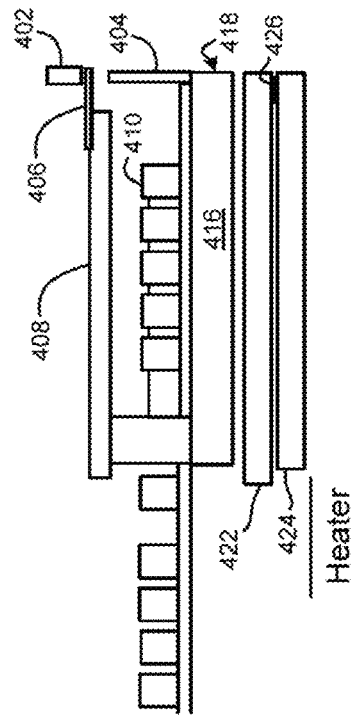
FIG. 4B is a cross-sectional view of one particular embodiment of a piggyback magnetic head with looped coils.
Figure 4A:
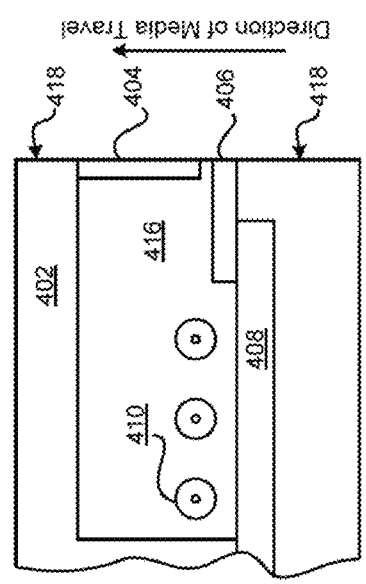
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

For the formation of a writer pole piece, any suitable method may be used. In one exemplary approach, the writer pole may be formed by masking a full film of magnetic pole material followed by an ion etch process to remove unmasked pole material. In a second exemplary process, a Damascene process may be used.

For embodiments where film growth is inside a constrained volume such as a Damascene trench, film growth conditions may be completely different from that out on an open surface (cavity CD is much smaller than plasma mean free path) because these techniques not only rely on chemical potential differences but also on vectorial momenta of the reactive species. For this reason, a surface chemical treatment prior to main pole formation that mainly relies on chemical potential differences between materials rather than line-of-sight particle kinetics will be much less dependent on the geometry restrictions. Without wishing to be bound by any theory, it is believed that a new Damascene gap process is described herein, which successfully forms a conforming write gap, as well as improves the magnetic properties (e.g. softness) of the main pole.

Figure 5:
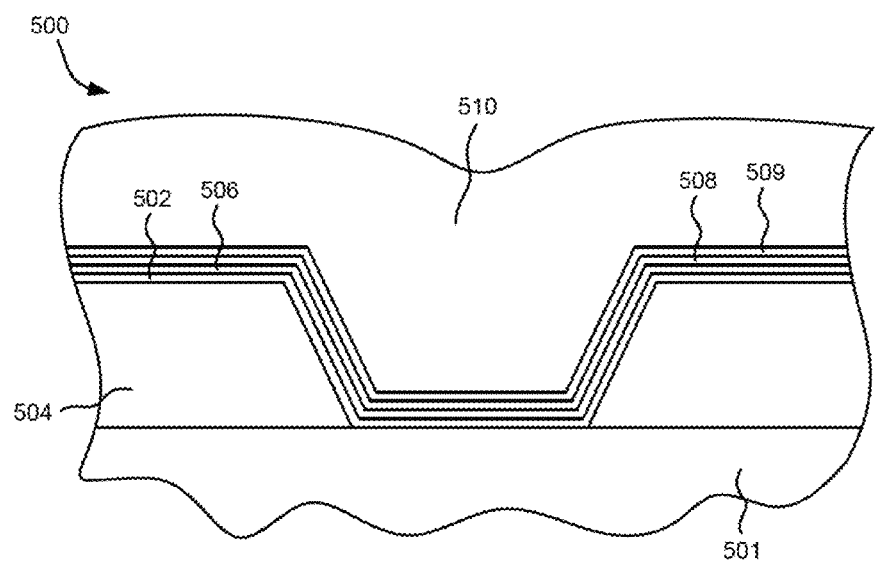
FIG. 5 is a partial cross-sectional view of a magnetic head during fabrication of a main write pole thereof, according to one embodiment.

Now referring to FIG. 5, a cross section view of a partially formed magnetic head 500 is shown according to one embodiment. Of course, this embodiment may be used in conjunction with any structures and systems described in any of the other figures. In order to simplify and clarify the structures presented, spacing layers, insulating layers, and write coil layers may be omitted from the subsequent figures and descriptions.

The partially formed magnetic head 500 of FIG. 5 may preferably include at least one seed layer 502, e.g., in a trench, e.g., a trench material 504 such as alumina positioned above a leading shield layer 501. According to one approach, the at least one seed layer may include a platinum group metal, etc. Such a seed provides a proper catalytic effect promoting subsequent chemical vapor deposition (CVD), atomic layer chemical vapor deposition, etc. or any other process which would be apparent to one of skill in the art upon reading the present description.

In embodiments where the substrate includes alumina, the alumina is not a suitable surface for CVD Ru growth. Therefore, the seed layer may preferably be implemented so as to provide catalysis for CVD Ru growth. Noble metal seed material is not ideal for adhesion, so typically an adhesion layer may be placed beneath the catalytic seed. Such adhesion layer is not necessary and may be implemented only if adhesion issues arise, with no adverse effect on the growth of magnetic pole. Starting at the substrate, all of the crystalline materials added above it will have an effect on the ultimate main pole material.

Previously, a magnetic property enhancing pre-seed was required before the seed layer 502 was applied to allow for both efficient atomic layer chemical vapor deposition seed layer growth and subsequent main pole growth. However, tests of the present embodiment have proven that this pre-seed is no longer necessary; however the pre-seed layer may be included in some embodiments.

Moreover, the partially formed magnetic head 500 includes nonmagnetic gap layer 502 and 506 in the trench 504. If the seed layer 502 is present, the nonmagnetic gap layer 506 is formed thereafter. In various approaches, the nonmagnetic gap layer may include Ru or any other nonmagnetic material which is technologically possible to be used as a gap and would be apparent to one of skill in the art upon reading the present description. In most approaches, but not all, the gap layer thickness is determined by the gap design of the structure, but typically hundreds of nanometers. In a similar approach, the individual thicknesses of all the layers may be changed in order to arrive at a combination which satisfies the overall gap design thickness predetermined for the group of layers.

The partially formed magnetic head 500 may further include a pole seed layer 508 above the nonmagnetic gap layer 506. In one approach the pole seed layer 508 may include a material selected from a group consisting of NiCr, Ta, Ta/Ru (or Rh), NiCr/Ru (or Rh), NiCr, CoOx, Ru, Rh, Cu, Au/MgO, Ta/Cu, etc. or any other material which would be apparent to one of skill in the art upon reading the present description. In various approaches, the pole seed layer may be from about 10 to about 100 Angstroms thick, but may be thicker or thinner based on the design. Such pole seed is typically capped by a second seed layer 509, which is usually the same as the pole (510) material as described below.

The partially formed magnetic head 500 has a pole layer 510 of a magnetic material above the pole seed layer 508 and 509. In one approach, the pole layer may primarily include CoFe of various compositions which typically is between 10 to 50 wt % Co or similar material, sometimes with minority dopant which would be apparent to one of skill in the art upon reading the present description. In one particular approach, the pole geometry formed by the pole layer 510 at the ABS surface of a finished head may have a trapezoidal cross sectional shape when the cross section is parallel to the ABS or other shapes. In various approaches, the pole layer may be from about 10 to about 100 nanometers wide and height, but may vary based on the design.

In one approach, the pole layer may be physically characterized as being an electroplated layer.

At least one of the nonmagnetic gap layer 506, the pole seed layer 508 and the pole layer 510 may have nitrogen therein. This nitrogen in one or more of the layers is believed to result from the additive process described below, which causes nitrogen to diffuse into the nonmagnetic gap layer, and then to, in some cases, diffuse into the adjacent layers such as the pole seed layer.

In one approach, the pole seed layer may have more nitrogen (e.g. higher molecular and/or volumetric concentration) therein than the nonmagnetic gap layer may have. According to different embodiments, determining these nitrogen levels may be made by using any suitable chemical analysis technique, such as Gas Discharge Spectroscopy (GDS), X-ray Diffraction (XRD), etc.

Figure 6:
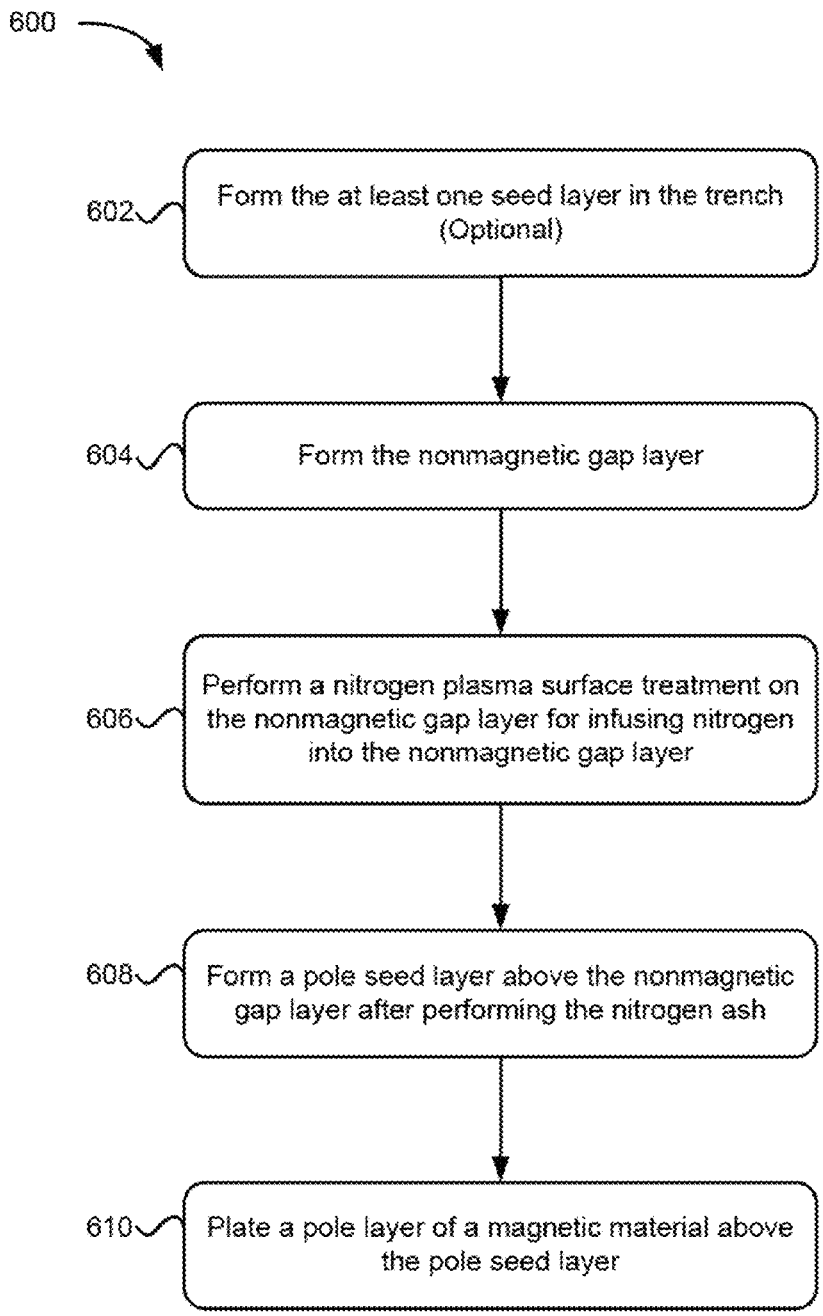
FIG. 6 depicts the process steps of a method according to one embodiment.

Referring to FIG. 6, a method 600 is described for forming a magnetic head according to one embodiment. The method 600 may be carried out in any desired environment, including those described in FIGS. 1-5. In addition, any of the previously described embodiments taught and/or suggested herein may be implemented in conjunction with the method 600 described hereinafter. It is also to be noted that while the nitrogen infusion may be introduced at a step prior to pole seed layer 508 is being put down, it should also work if N is introduced when during step 608.

In operation 602, at least one seed layer may be formed in the trench. In one approach, the trench under the at least one seed layer may have amorphous sidewalls. In another approach, the bottom of the trench may serve as a shield. Optionally, more than one seed layer may be formed.

In operation 604, the nonmagnetic gap layer may be formed. In one approach, the nonmagnetic gap layer may be formed above the at least one seed layer.

In operation 606, a nitrogen plasma surface treatment may be performed on the nonmagnetic gap layer for infusing nitrogen into the nonmagnetic gap layer. According to various approaches, the nitrogen plasma surface treatment may incorporate nitrogen ash, $N_2H_2$ ash, etc. or other treatments.

According to one preferred embodiment, the nitrogen plasma surface treatment uses ionization of atomic nitrogen so that it becomes more reactive. The nitrogen may be ionized implementing any process and/or device known in the art including, but not limited to radio frequency (RF), etc. Without wishing to be bound by any theory, it is believed that when the ionized nitrogen is applied to the nomnagnetic gap layer, it diffuses into and at least partially saturates the layer in a very short amount of time.

According to one illustrative embodiment, the ionized nitrogen is derived from a molecule having nitrogen, such as a gaseous mixture of $N_2$ and $H_2$. Preferably, the mixture may include about less than 10% hydrogen, where percentages are atomic percentages unless otherwise specified. In one approach, an atmosphere during the nitrogen plasma surface treatment may be at least 50% of the molecule having the nitrogen, more preferably at least 80% nitrogen, more preferably at least 90% nitrogen, still more preferably at least 95% nitrogen, but could be higher or lower based on the design. Moreover, having an atmosphere with over at least 50% hydrogen is preferably avoided, as it could form a potentially explosive and dangerous situation. It is to be understood that the use of nitrogen hydrogen mixture is of engineering convenience, not of technical necessity. Any minority gas component may be combined with nitrogen in achieving the same desired results.

Surprisingly and contrary to conventional wisdom, it has been found that by performing the nitrogen plasma surface treatment on the nonmagnetic gap layer surface before the pole seed layer is added (see step 608, below), the pole layer coercivity shows a dramatic improvement, independent of the substrate layer and the seed type. This has been found to be true, in spite of the fact that the magnetic seed 509 is one layer below layer 508, and yet the property of layer 509 is being greatly influenced by treatment of surface not immediate adjacent to the layer. This result could not have been predicted.

In fact, the nitrogen plasma surface treatment being performed during experimentation was not intended to improve the pole layer at all. The nitrogen plasma surface treatments were actually implemented in an attempt to clean off surface oxide for subsequent process steps. Rather, hydrogen was being used in an attempt to reduce the substrate surface oxide levels, in an attempt to reduce surface oxide. Nitrogen was merely added to the atmosphere to reduce the hazards of high hydrogen concentrations. However, when the devices were tested, unexpected improvements to the magnetic properties of the structure were observed.

While the precise mechanism is unknown, and without wishing to be bound by any theory, it is believed that the pole seed layer becomes at least partially saturated with nitrogen diffusing into the pole seed layer from the gap layer, thereby increasing the pole seed layer's lattice defect density. Again without wishing to be bound by any theory, it is also believed that the underlying mechanism that leads to the surprisingly observed improvement is due largely in part to grain size and lattice compressive strain reduction. It is presently contemplated that the altered state of the pole seed layer, due to the diffusion of nitrogen therein during formation of the pole seed layer and/or thereafter, relaxes the film stress of the subsequent pole film as well as limits the pole grain size. Such change in the property and microstructure lead to film with desirable magnetic properties.

According to conducted experiments, embodiments with various substrate layer structures, as well as different seed types have been tested. The results demonstrate that the nitrogen plasma surface treatment described in the process leads to pole layer coercivity improvement, independent of the substrate layer and the seed type.

Figure 7:
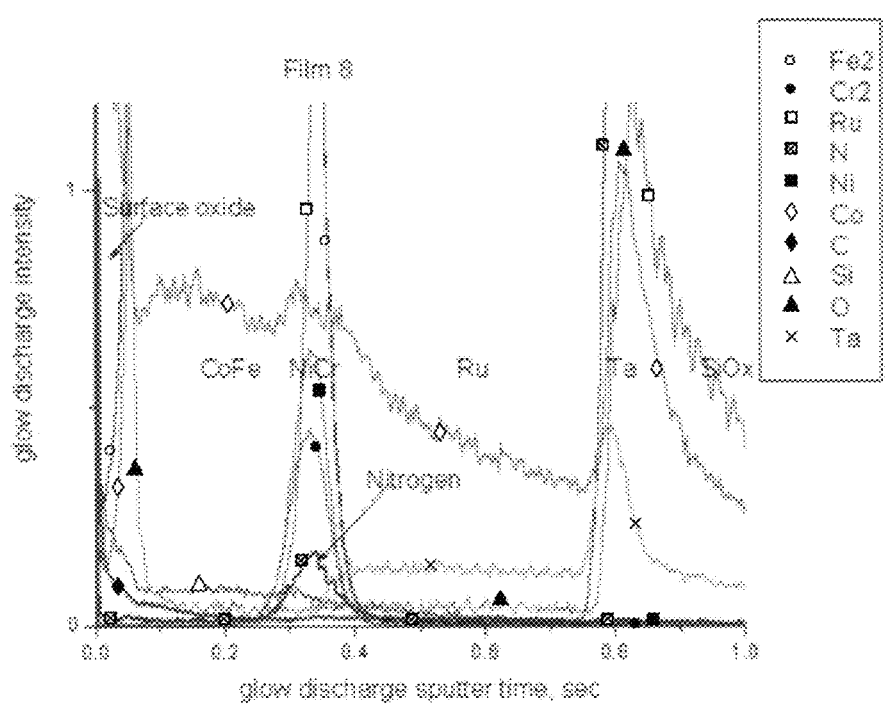
FIG. 7 is a chart showing analytical results of an experimental embodiment.

In accordance with one illustrative embodiment, FIG. 7 depicts a chart of glow discharge test results of a NiCr pole seed layer grown on a Ru gap layer treated with a nitrogen plasma surface treatment using a gaseous mixture of nitrogen and hydrogen. As shown, the results demonstrate that the NiCr pole seed layer has a very high nitrogen content as compared to the neighboring Ru and CoFe layers. The chart also appears to demonstrate that the nitrogen may additionally enter the CoFe, as the graph in FIG. 7 shows a non-zero level of nitrogen in the CoFe portion of the chart.

high vacuum energetic sputtering. Without wishing to be bound by any theory, it is also believed that a process which relies on high pressure chemical vapor is much more conformal than a physical vapor low pressure process. In one illustrative embodiment, $N_2H_2$ plasma ashing represents such a chemical vapor process whose chemical reactivity is enhanced by plasma ionization (PECV process). Thus, it is believed that the high pressure plasma surface treatment is much less geometry dependent (or is more isotropic) than common line-of-sight physical vapor deposition involved in seed optimization.

In previous attempts, the effectiveness of a pole seed in promoting soft pole layer growth was limited by the substrate type and/or incoming underlayer film types. However, surprisingly and contrary to conventional wisdom, the effect of the substrate can be erased by implementing a nitrogen plasma surface treatment prior to forming the pole seed layer.

As seen in Table 1, regardless of the seed used, both the grain size and lattice strain of the pole layer is reduced when grown with the pole seed layer.

TABLE 1

| Substrate Film Structure/Sequence | | | | Film Structure | | Magnetic Properties | | | |
|---|---|---|---|---|---|---|---|---|---|
| TOX | Ta, | Ru, A | ALCVD Ru, A | Etch | NiCr/CoFe | Hce, Oe | Hch, Oe | Strain % | Grain Sz, A |
| Yes | 0 | 70 | 400 | Ar | 10/200 | 25.26 | 22.25 | −0.65 | 205 ± 67 |
| Yes | 0 | 70 | 400 | N2H2 | 10/200 | 18.33 | 15.66 | −0.33 | 191 ± 51 |
| Yes | 20 | 50 | 400 | Ar | 10/200 | 44.12 | 40.37 | −0.14 | 140 |
| Yes | 20 | 50 | 400 | N2H2 | 10/200 | 17.2 | 15.15 | −0.01 | 115 |

Without wishing to be bound by any theory, it is believed that the effect of the pole seed layer is to limit the pole layer's grain growth which may improve the softness of the pole layer film. The pole seed layer is also believed to reduce compressive strain to close to zero, or to small tensile, as shown in Table 2.

TABLE 2

| Substrate Film Structure/Sequence | | | | Film Structure | | Magnetic Properties | | | |
|---|---|---|---|---|---|---|---|---|---|
| TOX | Ta, | Ru, A | ALCVD Ru, A | Etch | NiCr/CoFe | Hce, Oe | Hch, Oe | Strain % | Grain Sz, A |
| Yes | 0 | 70 | 400 | Ar | 10/200 | 25.26 | 22.25 | −0.65 | 205 ± 67 |
| Yes | 0 | 70 | 400 | N2H2 | 10/200 | 18.33 | 15.66 | −0.33 | 191 ± 51 |
| Yes | 20 | 50 | 400 | Ar | 10/200 | 44.12 | 40.37 | −0.14 | 140 |
| Yes | 20 | 50 | 400 | N2H2 | 10/200 | 17.2 | 15.15 | −0.01 | 115 |
| Yes | N/A | N/A | N/A | Ar | 0/200 | 54.7 | 53.6 | 0.11 | 441 |
| Yes | N/A | N/A | N/A | N2H2 | 0/200 | 32.81 | 31.48 | 0.33 | 427 |
| Yes | N/A | N/A | N/A | Ar | 10/200 | 8.347 | 4.475 | −0.06 | 123 |
| Yes | N/A | N/A | N/A | N2H2 | 10/200 | 7.287 | 3.987 | −0.08 | 122 |

Without wishing to be bound by any theory, it is believed that the spike of nitrogen seen in the NiCr portion of FIG. 7 effectively may inhibit the grain size of the NiCr and more importantly that of CoFe. In general, materials want to have larger grain sizes in an attempt to reduce grain boundary energy. Without wishing to be bound by any theory, it is believed that the nitrogen may act as a barrier for grain growth; therefore smaller and more numerous grains are grown.

Equally important, since the functionality of the nitrogen plasma surface treatment in this case is fundamentally a chemical treatment, its effectiveness is believed to be much less affected by the line-of-sight geometrical effect as do by According to one illustrative embodiment, because CoFe has a large positive magnetostriction coefficient (e.g. about $4\times10^{-5}$ to about $5\times10^{-5}$), a compressive stress will induce out-of-plane rotation of magnetization. Without wishing to be bound by any theory, it is believed that the reduction of CoFe coercivity is due to compressive stress reduction. Thus, a pole seed layer deposited onto a nitrogen plasma treated surface provides reduced grain size, and reduced compressive film stress, both of which surprisingly and unexpectedly lead to improvements of the main pole.

While these reductions due to the nitrogen plasma surface treatment are beneficial, by no means are they, or any other nitrogen treatment technique, the only effective way to improve pole layer properties; rather they are additional benefits which may complement other improvements.

It was found that the nitrogen plasma surface treatment successfully improved all of the embodiments which were tested. Again, without wishing to be bound by any theory, it is believed that nitrogen plasma surface treatment is not limited to NiCr-seeded high moment CoFe film; but also can be seen from CoFe on bare thermal oxide and on other metal seeds; e.g. Cr, etc. It is suspected that the slight lattice mismatch induced by the metal seed (e.g. NiCr, etc.) may be relaxed by the incorporation of nitrogen into the NiCr, through nitrogen diffusing into the NiCr seed according to one approach.

According to another tested embodiment, a low-mismatch CoFe growth resulted in a less compressive lattice strain in CoFe. Without wishing to be bound by any theory, it is believed that the available nitrogen at the interface may favor interfacial nitride nanocrystallite formation impeding CoFe column lateral growth, and reducing in-plane grain size. If this is the mechanism, it is believed that the effect of nitrogen plasma surface treatment is not limited to Ru but other crystalline surface as well. While NiCr seed for CoFe in the context of nitrogen plasma surface treatment appears to be the most beneficial, it should not be considered the only candidate for pole seed layer material.

With continued reference to method 600 of FIG. 6, In operation 608, a pole seed layer may be formed above the nonmagnetic gap layer after the nitrogen plasma surface treatment (nitrogen ash) is performed.

According to various approaches, the pole seed layer may be formed by a process, including physical vapor deposition (PVD), ion beam deposition (IBD), etc. or any other process which would be apparent to one of skill in the art upon reading the present description. As described above, according to one approach, the pole seed layer may be from about 10 to about 100 Angstroms thick, but may be thicker or thinner based on the design.

In operation 610, a pole layer of a magnetic material may be plated above the pole seed layer. According to one approach, the pole layer may be CoFe alloy with Fe content as majority phase (e.g. at least 50 wt %, preferably not more than 90 wt %) include CoFe at 55 to 75 wt %, etc. or any other material which would be apparent to one of skill in the art upon reading the present description.

In one embodiment, chemical mechanical polishing (CMP) may be performed on the pole layer to planarize the pole layer back to the amorphous layer, or any of the other layers shown in FIG. 5, or a desirable pole shape may be formed by any other known techniques as would be apparent to one of skill in the art. Additionally, further processing may be performed to form remaining parts of the head. For example, in one approach, the amorphous material forming the sidewalls of the trench may be removed, and side shields may be formed laterally to the nomnagnetic gap layer.

In one illustrative embodiment, a magnetic data storage system may include at least one partially formed magnetic head according to any of the embodiments described or suggested herein. The magnetic data storage system may further include a magnetic medium and a drive mechanism e.g., of a type known in the art, for passing the magnetic medium over the at least one partially formed magnetic head. According to one approach, the magnetic medium may include a magnetic tape, a magnetic disk, etc. or any other magnetic medium which would be apparent to one of skill in the art upon reading the present description. Furthermore, the magnetic data storage system may also incorporate a controller e.g., of a type known in the art, electrically coupled to the at least one partially formed magnetic head for controlling operation of the at least one partially formed magnetic head. In one approach, the electric controller may be electrically coupled to the partially formed magnetic head with a wire, wirelessly, etc. or any other electrically coupling configuration which would be apparent to one of skill in the art upon reading the present description.

A nitrogen plasma surface treatment on, according to one embodiment, a Ru surface, together with NiCr seed enables formation of a pole having low stress and a small grain size material state. The use of the high pressure nitrogen plasma surface treatment, in conjunction with NiCr seed to improve CoFe main pole permeability may be more robust and flexible in the context of Damascene main pole process because of its isotropic nature and its underlying reliance on chemical reactivity. This is a substantial benefit in dealing with constrained trench geometry where a CoFe main pole is formed according to one embodiment. In reality, all pressure sustainable in a vacuum system would have some benefit as described; only the degree of the effect is in question. In order to maximize the effect within a confined geometry as defined herein such as a Damascene trench/cavity, a minimum pressure of 3 milliTorr and above is preferred. The effect may be optimized at a much higher operating pressure. Such a tool and device dependent optimization is readily apparent to those experienced in the art. Although the benefits of low energy plasma treatment are the most relevant to Damascene main pole processes, the effect of nitrogen plasma surface treatment may be applied to other writer process flows and geometries where main pole material is the high moment CoFe, or other ferromagnets.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
a nonmagnetic gap layer in a trench;
a pole seed layer above the nonmagnetic gap layer; and
a pole layer of a magnetic material above the pole seed layer,
wherein the pole seed layer has nitrogen diffused therein,
wherein the nonmagnetic gap layer has nitrogen diffused therein,
wherein the pole layer is physically characterized as being an electroplated layer.

2. The magnetic head as recited in claim 1, wherein the nonmagnetic gap layer is Ru with the nitrogen diffused therein.

3. The magnetic head as recited in claim 1, wherein the pole seed layer comprises primarily a material selected from a group consisting of NiCr, Ta, Ta/Ru, Ta/Rh, NiCr/Ru, NiCr/Rh, CoOx, Ru, Rh, Cu, Au/MgO, and Ta/Cu.

4. The magnetic head as recited in claim 1, further comprising a seed layer upon which the nonmagnetic gap layer is formed.

5. The magnetic head as recited in claim 1, wherein the nitrogen is diffused into a lattice of the pole seed layer.

6. The magnetic head as recited in claim 1, wherein the pole seed layer has more nitrogen therein than the nonmagnetic gap layer.

7. The magnetic head as recited in claim 1, wherein the pole layer comprises primarily CoFe, wherein the pole layer has nitrogen therein.

8. The magnetic head as recited in claim 1, further comprising a second seed layer between the pole seed layer and the pole layer.

9. The magnetic head as recited in claim 8, wherein the pole seed layer and the second seed layer have different compositions.

10. The magnetic head as recited in claim 9, wherein the second seed layer is constructed of the same materials as the pole layer.

11. A magnetic data storage system, comprising:
   at least one magnetic head as recited in claim 1;
   a magnetic medium;
   a drive mechanism for passing the magnetic medium over the at least one magnetic head; and
   a controller electrically coupled to the at least one magnetic head for controlling operation of the at least one magnetic head.

12. The magnetic head as recited in claim 1, wherein the nitrogen diffused in the pole seed layer is physically characterized as diffused into the pole seed layer from the nonmagnetic gap layer.

13. A magnetic head, comprising:
   a nonmagnetic gap layer in a trench, wherein the nonmagnetic gap layer has nitrogen diffused therein;
   a pole seed layer above the nonmagnetic gap layer, the pole seed layer being comprised primarily of a material selected from a group consisting of NiCr, Ta/Ru, Ta/Rh, NiCr/Ru, NiCr/Rh, CoOx, Ru, Rh, Cu, Au/MgO, Ta/Cu; and
   an electroplated pole layer comprised primarily of CoFe above the pole seed layer,
   wherein at least one of the pole seed layer and the pole layer has nitrogen therein.

14. The magnetic head as recited in claim 13, wherein the nonmagnetic gap layer is Ru with the nitrogen diffused therein.

15. The magnetic head as recited in claim 13, wherein the pole layer is physically characterized as being an electroplated layer.

16. The magnetic head as recited in claim 13, wherein the nitrogen is diffused into a lattice of the pole seed layer.

17. The magnetic head as recited in claim 13, wherein the pole seed layer has more nitrogen therein than the nonmagnetic gap layer.

18. A magnetic data storage system, comprising:
   at least one magnetic head as recited in claim 13;
   a magnetic medium;
   a drive mechanism for passing the magnetic medium over the at least one magnetic head; and
   a controller electrically coupled to the at least one magnetic head for controlling operation of the at least one magnetic head.

19. The magnetic head as recited in claim 13, further comprising a seed layer upon which the nonmagnetic gap layer is formed.

20. The magnetic head as recited in claim 13, further comprising a second seed layer between the pole seed layer and the pole layer.

21. The magnetic head as recited in claim 20, wherein the pole seed layer and the second seed layer have different compositions.

22. The magnetic head as recited in claim 21, wherein the second seed layer is constructed of the same materials as the pole layer.

23. The magnetic head as recited in claim 13, wherein the nitrogen diffused in the pole seed layer is physically characterized as diffused into the pole seed layer from the nonmagnetic gap layer.

* * * * *

UNITED STATES PATENT AND TRADEMARK OFFICE
CERTIFICATE OF CORRECTION

PATENT NO. : 8,760,804 B2
APPLICATION NO. : 13/411424
DATED : June 24, 2014
INVENTOR(S) : Brinkman et al.

Page 1 of 1

It is certified that error appears in the above-identified patent and that said Letters Patent is hereby corrected as shown below:

On the title page; item (54), and in the specification, col. 1, line 2 of the title replace "COFE" with --CoFe--.

In the specification:

col. 2, line 21 replace "nomnagnetic" with --nonmagnetic--;

col. 8, line 22 replace "nomnagnetic" with --nonmagnetic--;

col. 11, line 53 replace "nomnagnetic" with --nonmagnetic--.

Signed and Sealed this
Ninth Day of September, 2014

Michelle K. Lee
*Deputy Director of the United States Patent and Trademark Office*